May 18, 1926.
R. C. HOLMES ET AL
PROCESS FOR MAKING GASOLINE
Original Filed Nov. 21, 1918
1,585,496
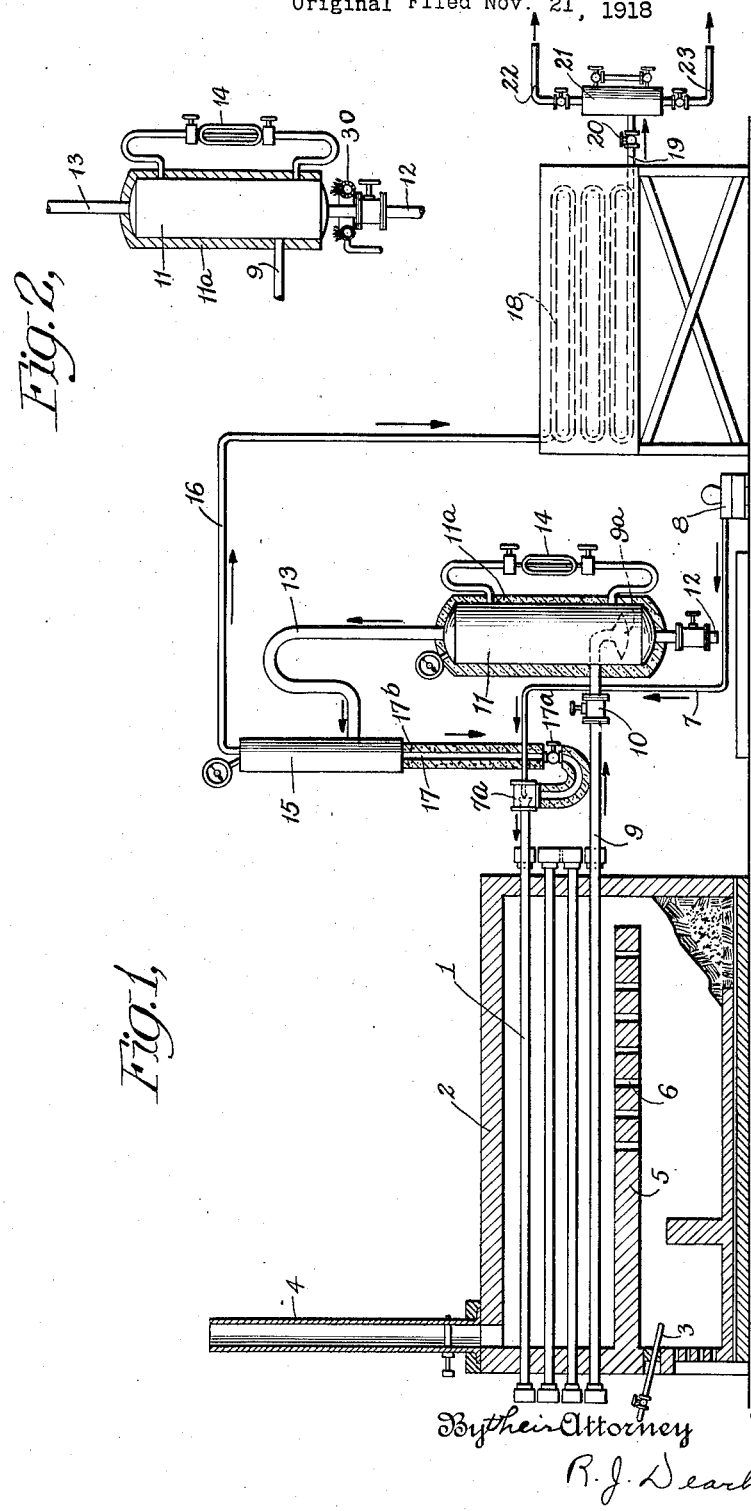
Inventors
R. C. Holmes
J. T. Manley
O. Behimer
By their Attorney
R. J. Dearborn Patented May 18, 1926.

1,585,496

UNITED STATES PATENT OFFICE.

RALPH C. HOLMES, OF NEW YORK, N. Y., FREDERICK T. MANLEY, OF HOUSTON, AND OTTO BEHIMER, OF PORT ARTHUR, TEXAS, ASSIGNORS TO THE TEXAS COMPANY, OF NEW YORK, N. Y., A CORPORATION OF TEXAS.

PROCESS FOR MAKING GASOLINE. REISSUED

Original application filed November 21, 1918, Serial No. 263,562. Divided and application filed April 6, 1923, Serial No. 630,242. Divided and this application filed August 13, 1925. Serial No. 49,962.

This invention relates to methods of making condensable light oils, such as gasoline. More particularly it relates to certain novel improvements in the cracking of hydrocarbons whereby higher boiling hydrocarbons are decomposed into those of lower boiling point.

This application is a division of our copending application, Serial 630,242, filed April 6, 1923, which itself is a division of our copending application, Serial 263,562, filed November 21, 1918.

In prior methods of cracking hydrocarbon oils, considerable difficulty has been experienced on account of carbon formations, which occur on the sides of tubes and stills exposed to the heat required to carry on the cracking operation.

It is a broad novel feature of the herein disclosed process that substantially all of the cracking operation occurs in a vessel to which no external heat is applied, except at such times and in such quantities as are necessary to compensate for heat losses, the oil prior to its introduction to such vessel having been subjected to a high degree of cracking heat and the excess heat of the oil itself being used to effect its own decomposition. As a consequence, we avoid substantial carbon formation of the destructive character which have proved such an impediment to prior systems. The removal of the cracking operation from the heating zone also reduces the danger from fires such as frequently occur where cracking is carried on in highly heated stills and coils exposed to direct heat.

More specially our process preferably embodies a novel cyclic system in which a circuit of oil is constantly maintained under varying liquid and vapor phases. The oil to be treated on entering this circuit is subjected to a high degree of heat but the time element is so controlled with respect thereto that there is comparatively little decomposition and deposition of carbon while it is exposed to this external heat, the oil being rapidly removed from the heating zone and conducted to the cracking zone, where without necessarily being subjected to additional heat, it undergoes a molecular decomposition whereby carbon and light products are formed and liberated. It will be understood that oil cracking or conversion is dependent not only upon the relative conditions of pressure and temperature but also upon the time element with respect thereto, that is, the necessary pressure and temperature must be maintained for a sufficient period of time to enable the molecular decomposition or conversion to take place. According to the present invention, this time factor is so controlled, by regulating the rate of heating the oil passing through the heating zone that the temperature thereof is progressively raised in transit and reaches the desired cracking temperature near the end of the heating coil at about the time or a little before the oil emerges therefrom. Thus, although the oil is subjected to cracking heats in the heating zone, this temperature is attained only just previous to the exit of the oil therefrom, and therefore, the oil leaves the heating coil before any substantial decomposition and incident deposition of carbon takes place. Subsequently, the highly heated oil in a state of incipient decomposition, is delivered to the cracking zone, where the desired temperature and pressure conditions are continuously sustained and the cracking of the oil and the incident decomposition of carbon are effected. The bulk of the carbon is removed from the circuit by withdrawing from the cracking zone, portions of the residual oil. Although the process, in its broad conception, is complete at this stage of the operation, the light products preferably continue the cycle, leaving the cracking zone in the form of vapor and gas. These vapors and gases are then subjected to a reduction in temperature, whereby the heavier constituents thereof, such as kerosene, are condensed. The condensate preferably is combined with the charging oil entering the heating zone, thus completing the cycle. The constituents of the desired volatility are removed from the circuit and condensed. The outlets from the circuit are so controlled that the entire system is maintained under a pressure sufficient to insure the desired molecular transformation.

Our process is to be distinguished from those of the prior art, in which a circuit of liquid residuum is kept in circulation. When such oil is kept in circulation, considerable quantities of carbon are formed, owing to the readiness with which this type of oil carbonizes when exposed to high temperatures, the carbon forming in fine particles in the oil, and wherever it comes in contact with the heated metal surfaces, it attaches itself thereto and builds up deposits, which often cause the choking of tubes and coils. It also crystallizes the metal surfaces, thereby decreasing the tensile strength of the metal and causing the bulging and breaking of such surfaces. Any residual oil resulting from the cracking operation will necessarily contain a considerable amount of heavy polymerization products and carbon held in suspension in the oil, and to circulate such a residue through heated tubes is to continually pass into or produce in such tubes a large amount of free carbon. In our system, we do not circulate a residuum, but instead keep the residual oil removed from the application of external heat and withdraw the heavier portions thereof, which contain the bulk of the carbon, from the cycle at the cracking zone, and continue the cycle by means of the vapor generated, which contains the condensable product desired and also certain heavier vaporous constituents which are used to complete the cycle. By removing the heavier residuum from the cycle, we keep the circuit free from this source of carbon formation, and since we conduct substantially all of the cracking in a vessel to which either no external heat is applied or only a small quantity of heat is applied to maintain the requisite temperature conditions, we are thus able to effectively remove the carbon formed.

In cracking oil for gasoline, there is generally formed a considerable quantity of vapors heavier than gasoline, which may be generally designated by the term, kerosene. We preferably employ these heavier vapors as a carrier for the lighter vapors; they assist in maintaining a current of vapor by which the gasoline is removed from the cracking zone to a separator where the kerosene vapors are condensed and removed from the gasoline vapors which pass on to the condenser. The kerosene condensate, preferably at a temperature not materially below its boiling point, is injected or otherwise suitably forced into the heavy oil charge entering and flowing through the heating tubes whereby a foamy agitated mixture is produced by the acceleration of the circulation in the heating tubes resulting from the increased volume of oil therein, thereby preventing the settling and flow of the heavier portions of the oil along the bottom of the highly heated tubes and the consequent local overheating and carbonization of the oil, thus keeping the tubes substantially free from any slight carbon formations. These kerosene constituents are an excellent mechanical conductor of heat, and there is thus produced a heat cycle which materially assists in maintaining the proper temperatures in the heating and cracking zones. By maintaining these bodies in constant circulation, the kerosene constituents, which under existing methods have been found so difficult to decompose into lighter products, are, in our system, ultimately reduced to gasoline.

We have devised certain novel apparatus which is adapted for carrying out our process, and illustrates the preferred form thereof in the drawings in which, Figure 1 is a diagrammatic elevation of said apparatus;

Figure 2 is a detail view of a modified cracking drum which may be substituted for that of Figure 1.

It will be understood that other apparatus besides that illustrated may be used in carrying out our process.

Referring to Fig. 1 of the illustrative drawings, a tubular heating coil 1 is located in a furnace 2, having a burner 3 and a stack 4. As shown for illustrative purposes, the coil 1 comprises a plurality of horizontally disposed rows of tubes extending through the furnace and placed the one above the other. The adjacent ends of each alternate pair of tubes in each horizontal row are conveniently connected together by horizontally positioned return bends or fittings to form horizontal coils. The several horizontal coils thus arranged are conveniently connected together at their right-hand ends by vertically disposed return bends or fittings, as shown in Fig. 1, to form a single elongated and continuous heating coil through which the oil flows and is heated to the required degree. This coil is of extended length and restricted cross-section and has a relatively large and effective heating surface whereby the stream of oil passing therethrough is enabled to efficiently absorb heat and reach a high temperature with rapidity. A checkered brick baffle 5 having openings 6 may serve to distribute the heat evenly over the coil. A fresh oil charging line 7, having a jet or injector 7$^a$, extends to a pump 8, which is connected to a suitable source of oil supply (not shown). The pipe 9, having a valve 10, extends from the heating coil 1 to an enlarged cracking drum or chamber 11, within which it may terminate in a distributor 9$^a$. This distributor 9$^a$ may be of any suitable form to thoroughly distribute and diffuse the charging oil throughout the body of oil in the drum whereby an intimate contact of the highly heated charging oil with the body of oil in the drum is effected. The cracking drum is preferably provided with a jacket 11$^a$ of suitable insulating material to protect it against heat radiation and is equipped with a valved draw-off 12, a vapor outlet 13, and an oil gauge 14. The vapor outlet 13 extends to a separator 15, having a vapor outlet 16, and a condensate outlet 17. The vapor line 16 terminates in a water-cooled condenser coil 18, having an outlet 19 equipped with a regulatable pressure valve 20. If desired the valve 20 may be placed in the vapor line 16 but we prefer to maintain the pressure in the heating coil, cracking drum and separator through the condenser. The outlet 19 terminates in a collecting tank 21, having a valved gas outlet 22 and a valved distillate outlet 23. The condensate line 17, which is preferably insulated, as indicated at 17$^b$ is equipped with a valve 17$^a$ and is connected to the charging line 7 at the jet 7$^a$.

In conducting the process with the apparatus illustrated, the oil to be treated is forced through the charging line 7 under considerable pressure, and is rapidly flowed through the heating coil 1, where it is heated to the desired cracking temperature. Preferably this temperature is somewhat higher than the temperature at which it is desired to conduct the cracking operation and may or may not result in substantial vaporization. The oil on being forced through the coil acquires a high cracking temperature, but on account of the rapidity of its flow, decomposition is only in the incipient stages when the oil is discharged through the pipe 9 into the heat insulated cracking drum 11 where a constant body of oil is maintained at a cracking temperature under pressure. The distributor 9$^a$, if employed serves to discharge the oil into the cracking drum in a wide stream, thus thoroughly mixing the hot oil with the liquid body of oil maintained in the drum and diffusing the heat therethrough. This heat diffusion is materially aided by using a distributor with serrated edges. The rapid flow of the oil through the coil where it is closely confined is here suddenly retarded, as the oil enters the drum which is of ample volume. Thus the excess heat of the oil operates to maintain the body of oil at the desired cracking temperature and molecular decomposition and distillation are carried on vigorously, the higher boiling hydrocarbons continually breaking up into hydrocarbons of lower boiling point. The vapors and gas generated gather in the upper part of the cracking drum and pass out through the vapor outlet 13 to the separator 15, where there is effected a separation of hydrocarbons of desired volatility from those of less volatility. The hydrocarbons of the desired volatility pass out through the vapor line 16, by which they are conducted to the condenser 18, where they are condensed, and the condensed distillate is either intermittently or preferably continuously allowed to run into the collecting tank 21.

The temperature in the air condenser 15 is such that the less volatile hydrocarbons are condensed and dropped into the conduit 17, by which they are conducted while still hot to the jet in the charging line or other suitable device for forcing the condensate into the charging stream. The separator is preferably somewhat elevated so as to give a considerable head of liquid in the pipe 17, which preferably contains a U bend, as illustrated, in order to form a liquid seal therein. This head of liquid, together with the high pressure at which the oil in the charging line passes the jet, this pressure being ordinarily from 50 to 100 pounds higher than the pressure in the drum, insures that the condensate shall be constantly and positively drawn into the charging line and forced into the coil 1. The introduction of this hot condensate into the charging line increases the volume of oil in the heating coil and thereby accelerating the flow therein and producing a foamy mixture so that local overheating is prevented and the coil is kept substantially free from any slight carbon formations. This condensate consists in a type of hydrocarbon which when decomposed does not yield any great amount of carbon so that the oil charge is constantly being diluted with oil capable of being decomposed into lighter products without the production of large amounts of carbon. This condensate reaches the jet in a heated condition, preferably at a temperature not materially below its boiling point, so as to heat the charge of oil entering the heating coil. The heat cycle formed by the kerosene constituents contributes to the maintenance of the proper temperatures in the heating coil and the cracking drum. By injecting or otherwise suitably forcing this condensate into the heating coil we increase the volume of oil flowing therein without increasing the total amount of oil charged into the system at any given time.

A considerable pressure is maintained throughout the system, which pressure is regulated by means of the valve 20 or the valve on the gas outlet 22. The pressure used varies with the character of the oil operated on and the character of the product desired. Ordinarily the decomposition in the cracking drum is carried on under a pressure of from 100 to 400 pounds. In utilizing oils of the type commonly employed for decomposition into products of the nature of gasoline a temperature in the drum 11 of from 700° F. to 850° with a temperature in the coil 1 of from 700° F. to 950° F. is ordinarily used. For example, in cracking a paraffin base gas oil of a Baumé gravity of about 34°, a temperature of 850° F. in the coil and of 775° F. in the drum with a pressure of approximately 200 pounds has been used to advantage.

The oil to be decomposed is constantly forced into the heating coil thereby causing a steady stream of heated oil to enter the cracking chamber. The residuum is withdrawn preferably at such a rate that there is maintained a constant body of oil in the cracking zone.

It is desirable to equip the apparatus with the valves 10 and 17ª so that in case there is a break in the heating coil the effect of any fire resulting may be localized by closing said valves, whereby the bulk of oil in the system will be retained in the cracking drum 11. It is understood that in the normal operation of the process these valves are open.

Auxiliary heat may be supplied to the cracking drum in any suitable manner if desired, and a convenient method of providing this auxiliary heat is, as shown in Fig. 2, to insulate only the upper part of the drum and apply heat at a moderate temperature or in a relatively small quantity from any suitable heater such as is designated 30. In the early stages of a run, since there is no danger of overheating a carbon-free surface, the drum may be heated freely until the necessary heat cycle has been generated and decomposition has begun. For this reason the arrangement of Fig. 2 possesses certain advantages over that of Fig. 1. But when decomposition begins, with a consequent deposition of carbon, the heat must be reduced, as otherwise the carbon would accumulate on the hot surfaces and build up tenacious formations thereon, thus preventing the effectual removal of the carbon and asphaltic bodies. As the run continues only a moderate heat is applied, sufficient only to offset the loss of heat due to radiation and distillation. If desired the drum may be heated by means of waste heat from the furnace 2 or in any other suitable manner.

The product obtained by the herein disclosed process is, for a cracked product, remarkably sweet, in other words, low in unsaturated compounds.

It is understood that we use the terms gasoline and kerosene in this application by way of example and that these terms are taken as types of other similar distillates which may be produced by our process. We use the term gasoline as an example of the volatile product desired which under the temperatures and pressures used is a vapor in the separator 15 and is condensable in the cooling coil 18. We use the term kerosene as an example of those constituents which under the temperatures and pressures used is a vapor in the vapor line 13 but is condensable in the separator 15. It is to be noted that the gravity and boiling point of the products which will condense in the separator 15 depends upon the temperature therein under the pressures used.

Although for illustrative purposes the invention has been shown and described in connection with apparatus of more or less specific details of construction, arrangement and location of parts, and as embodying in its mode of operation a certain series and sequence of somewhat definite steps and operating conditions, it will be understood that many of the objects and advantages of the invention may be obtained, to a greater or less extent, through the employment of apparatus of modified character or, in fact, through variations or, in some cases, omissions, of certain of the component steps, without departing from the spirit and scope of the invention.

What we claim is:

1. The process of converting hydrocarbon oil which comprises forcing said oil through a coil and drum while applying heat to said coil and drum and allowing the vapors generated to develop pressure until decomposition of the hydrocarbon begins, then reducing the heat applied to the drum while securing it against substantial loss of heat through radiation and vaporization, and continuously supplying to the oil in the drum the necessary heat for decomposition by means of the stream of oil entering from the coil, the stream entering the coil being continuously commingled with a hot condensate separated out from the generated vapors.

2. The process of converting hydrocarbon oil which comprises forcing said oil through a coil and drum while applying heat to said coil and drum and allowing the vapors generated to develop pressure until decomposition of the hydrocarbon begins, then reducing the heat applied to the drum while securing it against substantial loss of heat through radiation and vaporization, and continuously supplying to the oil in the drum the necessary heat for decomposition by means of the stream of oil entering from the coil.

3. The process of converting hydrocarbon oil that comprises forcing a stream of oil through an elongated passageway of restricted cross-section and thence into an enlarged chamber while applying heat freely to both said passageway and said chamber to rapidly raise the oil to a cracking temperature and develop a superatmospheric cracking pressure therein and, after said conditions of temperature and pressure have been attained, applying to said enlarged chamber reduced or moderate heat sufficient only to maintain a cracking temperature in said chamber while continuing the free application of heat to said passageway.

4. The process of converting hydrocarbon oil that comprises passing a stream of oil through an elongated passageway of restricted cross-section, and then delivering it into an enlarged zone where a body of oil is maintained, freely heating the oil in said passageway and in said enlarged zone during the starting period until cracking conditions of temperature and pressure are established, and subsequently continuing the free heating of the oil in said passageway but applying to the body of oil in said enlarged zone a reduced and moderate amount of heat sufficient to offset heat losses and to maintain a cracking temperature therein throughout the period of normal operation.

5. The process of converting hydrocarbon oil that comprises freely heating a moving stream of oil in its passage through a heating coil and distillation drum during the starting period to rapidly establish cracking conditions of temperature and pressure therein, then continuing the maintenance of said conditions during the period of normal cracking operations by heating the oil in said drum at a reduced and moderate rate while continuing to freely heat the oil in the coil, removing the vapors from the distillation drum, and separating out and returning to the heating coil the condensed heavier fractions thereof.

In witness whereof I have hereunto set my hand this 23rd day of July, 1925.

RALPH C. HOLMES.

In witness whereof I have hereunto set my hand this 24th day of July, 1925.

FREDERICK T. MANLEY.

In witness whereof I have hereunto set my hand this 25th day of July, 1925.

OTTO BEHIMER.